United States Patent [19]

Vance

[11] Patent Number: 4,571,738
[45] Date of Patent: Feb. 18, 1986

[54] DEMODULATOR LOGIC FOR FREQUENCY SHIFT KEYED SIGNALS

[75] Inventor: Ian A. W. Vance, Newport, England

[73] Assignee: Standard Telephones and Cables plc, London, England

[21] Appl. No.: 613,426

[22] Filed: May 24, 1984

[30] Foreign Application Priority Data

Jun. 2, 1983 [GB] United Kingdom ............... 8315172

[51] Int. Cl.⁴ .................................... H04L 27/14
[52] U.S. Cl. .................................... 375/82; 329/104; 375/88
[58] Field of Search ............ 375/82, 88, 80, 42, 375/45, 90, 47; 329/104, 110, 107, 122, 124, 126

[56] References Cited

U.S. PATENT DOCUMENTS

| | | | |
|---|---|---|---|
| 4,193,034 | 3/1980 | Vance | 375/88 |
| 4,322,851 | 3/1982 | Vance | 375/88 |
| 4,486,715 | 12/1984 | Maas et al. | 375/94 |

FOREIGN PATENT DOCUMENTS

| | | | |
|---|---|---|---|
| 1517121 | 7/1978 | United Kingdom | 375/88 |
| 2057820 | 4/1981 | United Kingdom | 375/88 |

Primary Examiner—Marc E. Bookbinder
Assistant Examiner—M. Huseman
Attorney, Agent, or Firm—Kerkam, Stowell, Kondracki & Clarke

[57] ABSTRACT

A demodulator logic for FSK signals on an RF carrier in a direct conversion radio receiver, wherein the received signals are mixed with a local oscillator to provide quadrature baseband signals, characterized in that the demodulator logic comprises two clocked D-type flip-flops, FF1,FF2 one baseband signal being applied direct to the clock input CK of one flip-flop and inverted to the clock input CK of the other flip-flop, the second baseband signal being applied to the D inputs of both flip-flops, one input Q from one flip-flop being algebraically combined with one output $\bar{Q}$ from the other flip-flop to provide a demodulator signal output of the receiver, the two flip-flop outputs being chosen so that for a given FSK value they always have the same logic value.

3 Claims, 5 Drawing Figures

DEMODULATOR LOGIC FOR FREQUENCY SHIFT KEYED SIGNALS

This invention relates to demodulator logic for frequency shift keyed (FSK) signals on an RF carrier.

British Pat. No. 1,517,121 discloses a radio receiver of the so-called "direct conversion" type, also known as a "zero IF" receiver, in which FSK signals are mixed with a local oscillator to provide quadrature baseband signals which are then applied to a simple demodulating logic in the form of a clocked D-type flip-flop. In a described modification of the basic logic one of the two quadrature baseband signals is applied to the clock input of a first D-type flip-flop and to the D input of a second D-type flip-flop whilst the other baseband signal is applied to the D input of the first flip-flop and the clock input of the second flip-flop. The Q output of one flip-flop and the Q output of the other flip-flop are then algebraically summed to provide the demodulated output.

SUMMARY OF THE INVENTION

According to the present invention there is provided a demodulator logic arrangement for FSK signals on an RF carrier in a direct conversion radio receiver, wherein the received signal are mixed with a local oscillator to provide quadrature baseband signals, characterised in that the demodulator logic comprises two clocked D-type flip-flops, one baseband signal being applied direct to the clock input of one flip-flop and inverted to the clock input of the other flip-flop, the second baseband signal being applied to the D inputs of both flip-flops, one output from one flip-flop being algebraically combined with one output from the other flip-flop to provide a demodulator signal output of the receiver, the two flip-flop outputs being chosen so that for a given FSK value they always have the same logic value.

BRIEF DESCRIPTION OF THE DRAWINGS

Embodiments of the invention will now be described with reference to the accompanying drawings, wherein.

DETAILED DESCRIPTION OF THE INVENTION

Figure 1:
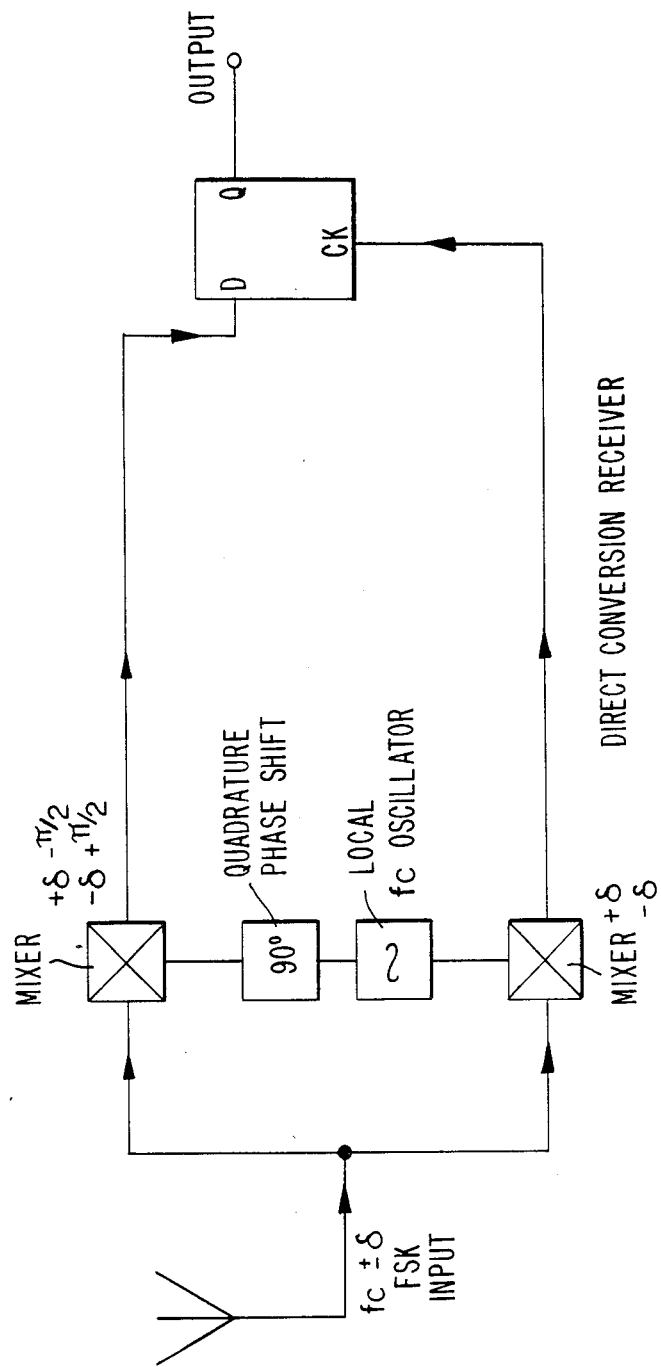
FIG. 1 illustrates a direct conversion receiver of the type illustrated and described in British Pat. No. 1,517,121 and U.S. Pat. No. 4,193,034.
Figure 1A:
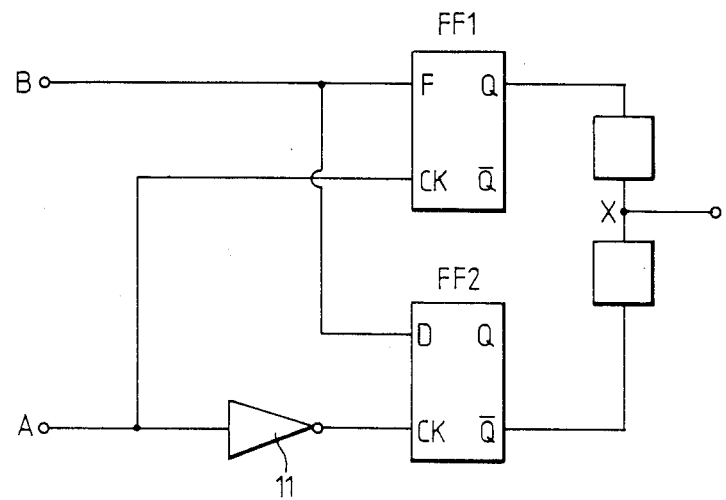
FIGS. 1A and 1B illustrate one demodulator logic arrangement and associated waveforms.
Figure 1B:
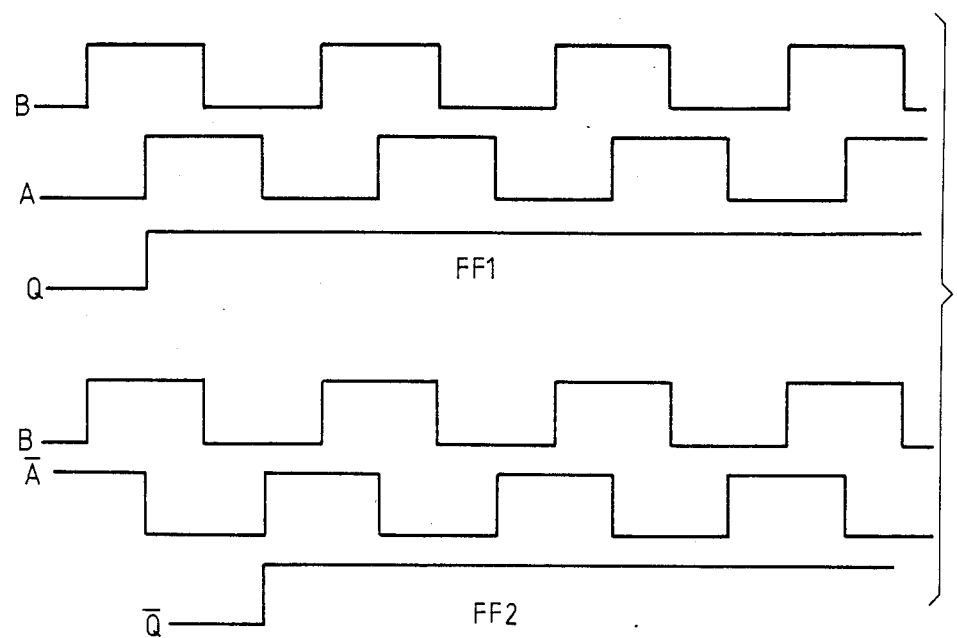

In the arrangement of FIG. 1A the two quadrature baseband signals A and B (corresponding to the A & B signals in FIG. 1) are applied to two clocked D-type flip-flops FF1 and FF2 in the following manner. The B baseband signal is applied direct to the D inputs of both FF1 and FF2. The A signal, in quadrature with respect to the B signal, is fed direct to the clock input of FF1 and via an inverter 11 to the clock input of FF2. The $\overline{Q}$ output of FF1 and the Q output of FF2 are each fed, via resistances, to a summing point X. FIG. 1B shows the A & B waveforms for FSK logic level '1' as they are applied to the flip-flops and the Q and $\overline{Q}$ output of FF1 and FF2 respectively. It will be noted that, irrespective of the current FSK value (i.e. whether A leads or lags B by 90°) the two flip-flops are now always clocked 180° out of phase, compared with the arrangement in Patent No. 1,517,121 where they can be clocked 270° apart.

Figure 2A:
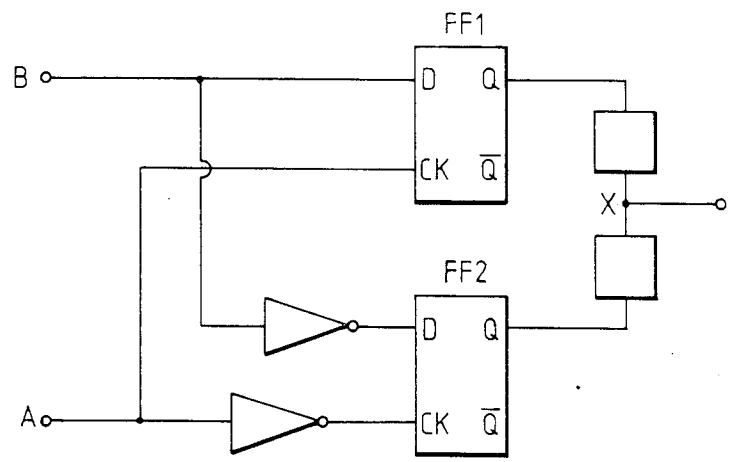
FIGS. 2A and 2B illustrate an alterative logic arrangement and associated waveforms.
Figure 2B:
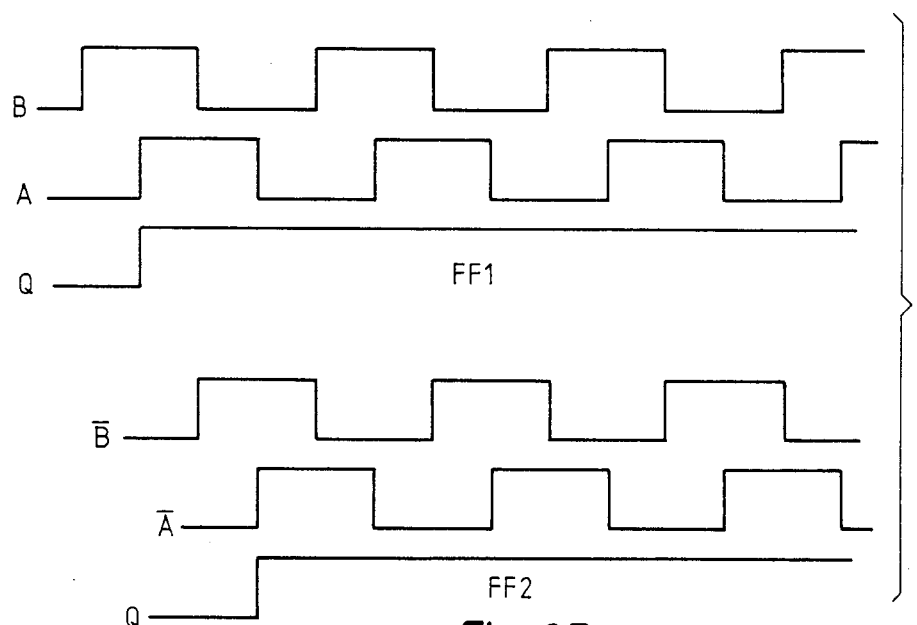

In the arrangement shown in FIG. 2A the B signal is fed direct to the D input of FF1 and inverted to the clock input of FF2. The A signal is fed direct to the clock input of FF1 and inverted to the clock input of FF2. The Q outputs of both FF1 and FF2 are then summed. The waveforms for FSK logic level '1' are shown in FIG. 2B.

In both arrangements it is to be noted that the two flip-flops are always clocked 180° out of phase, regardless of whether the A signal leads or lags the B signal by 90° (i.e. regardless of whether the FSK logic level is '0' or '1'). In the two flip-flop arrangements disclosed in Patent No. 1,517,121 it is possible for the flip-flops to be clocked 270° apart. The present invention thus reduces the jitter in the demodulated output by the same amount.

It is to be understood that the means whereby the A & B signals are obtained in quadrature is immaterial to the present invention, e.g. they can be produced in a direct conversion receiver in which the 90° phase shift can be obtained in either the r.f. input to the A & B channels, or in the local oscillator input the A & B channels, or in arrangements where the phase shift is obtained by the use of ±45° phase shift network in each channel. 9n

I claim:

1. A demodulator logic arrangement for FSK signals on an RF carrier in a direct conversion radio receiver, wherein the received signals are mixed with a local oscillator to provide quadrature baseband signals, characterised in that the demodulator logic comprises two clocked D-type flip-flops, one baseband signal being applied direct to the clock input of one flip-flop and inverted by an inverter to the clock input of the other flip-flop, the second baseband signal being applied to the D inputs of both flip-flops, means for algebraically combining one output from one flip-flop with one output from the other flip-flop to provide a demodulator signal output of the receiver, the two flip-flop outputs being chosen so that for a given FSK value they always have the same logic value.

2. A logic arrangement according to claim 1 characterised in that the second baseband signal is applied direct to the D inputs of both flip-flops and that the normal output of one flip-flop is algebraically combined with the complementary output of the other flip-flop.

3. A logic arrangement according to claim 1 characterised in that said baseband signals are applied direct to the respective clock and D inputs of one flip-flop and said baseband signals are applied inverted by an inverter to the respective clock and D inputs of the second flip-flop, and means for algebraically summing one output from one flip-flop with the corresponding output from the other flip-flop.

* * * * *